United States Patent
Newman

[19]

[11] Patent Number: 6,029,361
[45] Date of Patent: Feb. 29, 2000

[54] AIR-GUAGE NOZZLE PROBE STRUCTURE FOR MICROLITHOGRAPHIC IMAGE FOCUSING

[75] Inventor: Thomas H. Newman, Sunnyvale, Calif.

[73] Assignee: Ultratech Stepper, Inc., San Jose, Calif.

[21] Appl. No.: 09/047,422

[22] Filed: Mar. 25, 1998

[51] Int. Cl.[7] .............................. G01B 13/12; G01B 21/16
[52] U.S. Cl. ............................ 33/556; 33/549; 33/DIG. 2
[58] Field of Search ............................. 33/503, 549, 555, 33/556, 559, DIG. 2; 73/180

[56] References Cited

U.S. PATENT DOCUMENTS

| | | | |
|---|---|---|---|
| 4,836,019 | 6/1989 | Hagen et al. | 73/180 |
| 4,852,262 | 8/1989 | Babcock et al. | 33/DIG. 2 |
| 5,046,360 | 9/1991 | Hedberg | 73/182 |
| 5,353,516 | 10/1994 | Dalton | 33/549 |
| 5,373,222 | 12/1994 | Hemmerle et al. | 33/556 |
| 5,625,957 | 5/1997 | Breyer et al. | 33/503 |

OTHER PUBLICATIONS

I. K. Badiger, et al., Theory, Development and Performance Evaluation of Back–Pressure Pneumatic Gauging System, Mechanical Engineering Bulletin, vol. 14, No. 1, 1983, pp. 14–20 (the month is unknown).

David B. Kirk, Pneumatic Gaging, Instruments and Control Systems, vol. 33, Oct. 1960, pp. 1719–1721.

David B. Kirk, Introduction to Principles of Pneumatic Gaging, American Society of Mechanical Engineers, Oct. 1, 1952, Paper No. 52–A–113.

*Primary Examiner*—Christopher Fulton
*Assistant Examiner*—Quyen Doan
*Attorney, Agent, or Firm*—Allston L. Jones

[57] ABSTRACT

An air-probe structure of an air-gauge nozzle that defines an air-probe bore having an elongated, relatively small-area output tip (e.g., 0.3×1.3 millimeters) situated at the air-probe structure's output end. Such an air-gauge nozzle is useful in controlling the distance between the bore's output tip and a rowbar workpiece (employed in an optical microlithographic pole trimming step of the fabrication process for thin-film heads) in accordance with the air pressure measured by the air gauge. The air-probe structure's output end preferably also comprises a relatively large-area protective manifold (e.g., 6×7 millimeters) surrounding the elongated, relatively small-area output tip. This manifold, which protects the bore's output tip from damage which would otherwise result from inadvertent contact between the rowbar and the bore's elongated, small-area output tip, includes a set of interconnected channels to provide an escape route for air emerging from the bore's output tip and thereby prevent back pressure from being produced in the air-probe bore in response to the output end of said air-probe structure being situated in close proximity to the rowbar. A protective manifold Is also useful in protecting a conventional circular, small-area air-probe bore output tip of an air-probe structure from this type of damage. Also disclosed are air-gauge nozzles comprising a single block that, alternatively, has either two or three spaced-apart, functionally-independent air-probe structures extending from the output end of the single block.

18 Claims, 7 Drawing Sheets

AIR-GUAGE NOZZLE PROBE STRUCTURE FOR MICROLITHOGRAPHIC IMAGE FOCUSING

BACKGROUND

1. Field of the Invention

This invention relates to novel configurations for the probe structure of an air-gauge nozzle used in the microlithographic fabrication process of miniaturized devices and, more particularly, such probe-structure configurations used to achieve precise pole trimming as a step in the microlithographic fabrication process of miniaturized components (e.g, thin-film read/write heads for disk drives).

2. Description of the Prior Art

Figure 5:
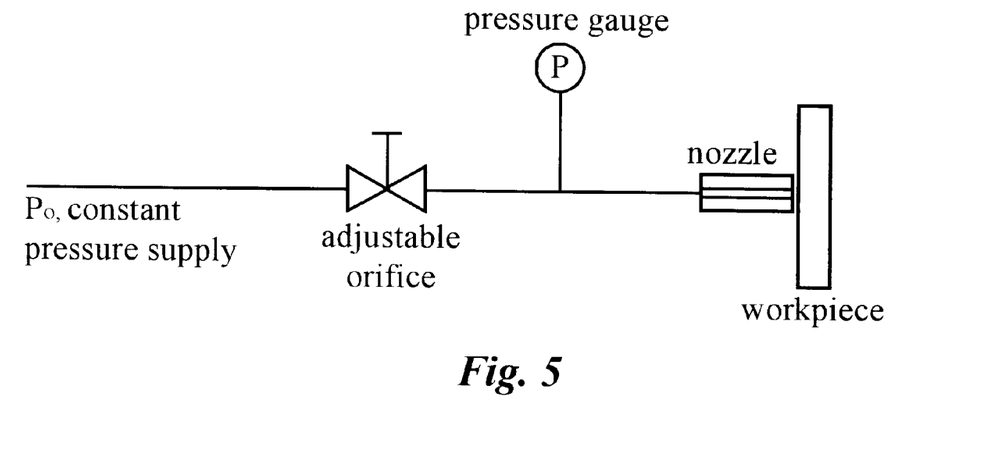
FIG. 5 is a schematic diagram of an air gauging system.

The concept of using air gauges for measuring mechanical dimensions has a long history. In a pressure-type air gauge (see FIG. 5), air from a constant pressure supply $P_0$ flows through an adjustable orifice, and then through a circular air-probe structure at the output tip of a nozzle which is placed in close proximity to a workpiece. The pressure measured by a gauge placed between the orifice and the output tip of the of nozzle's air-probe structure varies in inverse proportion to the distance between this output tip and the workpiece. With suitable plumbing and gauging, spacing between the air-probe structure's output tip and the workpiece can be measured with a precision better than 1 µm.

In practice, the variable orifice is set to a value such that the measured pressure $P_{out}$ is approximately mid-range when the air probe's output tip is at its nominal working distance with respect to the workpiece. If the workpiece were to come in contact with the air-probe structure's output tip of the nozzle, the pressure would rise to the supply pressure $P_0$. When the workpiece is removed, the gauge pressure drops to a low value, which is not zero because of the back-pressure inherent in the nozzle. In practice, the air gauge is typically operated with the air-probe structure's output tip and workpiece spacing in a near-linear region between these extremes.

The electrical analogue to the air gauge (see FIG. 6) is a serially connected voltage divider. Constant pressure is modeled by a constant electromotive force $V_0$, the orifice by an adjustable resistor $R_1$, and the nozzle by a variable resistor $R_2$. The latter is a combination of the fixed resistance of the nozzle's air-probe structure itself with a resistance which varies with the nozzle-workpiece spacing. This variation can be determined empirically.

Figure 6:
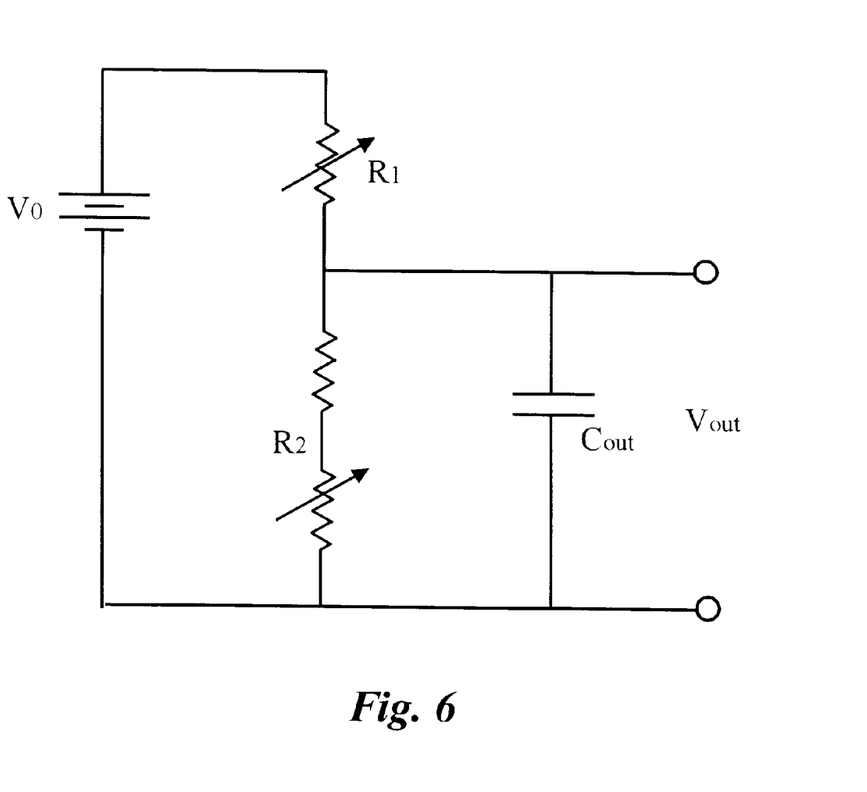
FIG. 6 is an electrical analogue of an air gauging system of FIGURES.

A nozzle's air-probe structure output tip in contact with the workpiece is modeled by an infinite impedance $R_2$, and in that situation the output voltage $V_{out}$ would rise to the supply voltage. The air capacity of the system between the orifice and the air-probe structure's output tip is modeled by a capacitance $C_{out}$ in parallel with $R_2$. The time response of the measurement system thus depends on the values of $R_1$, $R_2$, and $C_{out}$. Therefore, it is desirable to minimize the values of $R_1$, $R_2$, and $C_{out}$ to achieve a fast response. In optical microlithography, as known in the art, an image of tiny spatial patterns is projected on a resist-coated surface of an object. The object may be located on a stepper having six degrees of freedom that employs servo-control means to precisely position the object so that the focal plane of the projected image of tiny spatial patterns coincides with the object's resist-coated surface (i.e. the object's resist-coated surface is positioned within the limited depth of focus of an optical lithography projection system).

The air gauging technique may be used to measure the height of a workpiece, such as a resist-coated wafer in an optical lithography tool. In typical applications, such as semiconductor microlithography, the area sensed by the air gauging technique is not generally an issue. This "footprint" area is roughly equivalent to the inner diameter of the nozzle which defines the area of air probe output tip, and the reading is proportional to the average height over that area.

Another application for optical microlithography is the fabrication of thin-film read/write heads for disk drives, which employs a "rowbar" technique for the step of trimming the poles of otherwise already-fabricated disk-drive thin-film heads. In this "rowbar" technique, the spatial resolution becomes a concern. Rather than averaging the height over an extended area, it is desirable to sense the height at a specific location over a small area.

For example, the original full-size Winchester thin-film head had dimensions of 0.220×0.135×0.076 inches (i.e., 5.59×3.43×1.93 millimeters). However, several generations of miniaturization of thin-film heads have taken place. In the so-called pico-sized thin-film heads, the dimensions of each head has been reduced to only 0.049×0.039×0.012 inches (i.e., 1.24×0.99×0.305 millimeters (mm)). One way to provide an air gauge nozzle. having an inner nozzle diameter sufficiently small for the step of trimming the poles of pico sized thin-film heads is to simply scale down the inner probe diameter to the desired size so that the area sensed by the air probe output tip of the nozzle is adequately small. The drawback of this approach is that the back pressure of the air probe can become extremely high, which compromises the ability to make accurate measurements. In addition, the flow rate is low, and the response time for a gauging system which monitors pressure can become prohibitively slow. Furthermore, the nozzle's output end can become so small that it is prone to mechanical damage which may be caused by inadvertent contact with the workpiece surface.

SUMMARY OF THE INVENTION

The present invention is directed to either one or both of two improvements in a nozzle of an air gauge used to determine the distance between the output end of an air-probe structure of the nozzle and a workpiece in accordance with the air pressure measured by the air gauge. Specifically, the air-probe structure defines an air-probe bore having a given cross-sectional area at its output tip (which is situated at the air-probe structure's output end).

The first improvement, which involves a bore's output tip having a scaled-down cross-sectional area, is to provide the output end the air-probe structure with a protective manifold that surrounds the cross-sectional area of the bore's output tip, wherein the area of the protective manifold is sufficiently larger than the cross-sectional area of the bore's output tip to prevent damage to the output tip by inadvertent contact between said workpiece and said bore's output tip.

The second improvement, suitable for the dimensions of miniaturized components produced by a microlithographic fabrication process (e.g., pico-sized thin-film heads) is to provide an elongated air-probe bore output tip, wherein its cross-sectional area is defined by a length dimension which is significantly larger than a width dimension of the component. This elongated air-probe bore cross-section permits an enlarged-size cross-sectional area that avoids the aforesaid drawback of undesired back pressure occurring in the air probe.

DESCRIPTION OF THE PREFERRED EMBODIMENTS

For purposes of fully understanding the probe structure of the present invention, a typical miniaturized component with which the probe might be used is described herein in detail. A completely fabricated thin-film head 100 shown in FIG. 1 comprises ceramic substrate block 102 (typically comprising $Al_2O_3$/TiC) covered with a multilayered stack of thin films 104 that define either a single thin-film inductive head or, alternatively, a single thin-film magneto resistive head. In either case, the head's structural elements are mostly embedded within a multilayered stack of thin films 104. However, extending out from stack 104 to exposed regions of the top b x c surface 105 of block 102 are electrical contact pads 106 and 108. Further, a region 110 of the front a x b surface 111 of block 102 (shown in detail in FIG. 1a) includes exposed tips 112 and 114, respectively, of the otherwise embedded thin-film top and bottom poles (typically comprising NiFe) of stack 104 surrounded by exposed portions of $Al_2O_3$ thin-films 116 of stack 104. As indicated in FIG. 1a, part of region 110 forms two laterally spaced excavated cavities 117-1 and 117-2 in the a x b surface 111. All of the exposed untrimmed portions of relatively top pole tip 112 are recessed within cavities 117-1 and 117-2 so that only the trimmed portion 112T of top pole tip 112, defined by the lateral spacing between cavities 117-1 and 117-2, extends out to the plane of the a x b surface 111. Bottom pole tip 114, which has a width that is relatively large with respect to the width of top pole 112, is separated from top pole tip 112 by narrow gap 118 of $Al_2O_3$ material. As indicated, only the top portions 114-1 and 114-2, respectively, of bottom pole tip 114 are recessed within spaced cavities 117-1 and 117-2. Therefore, most of bottom pole tip 114, which includes trimmed pole-tip portion 114T situated in cooperative relationship with trimmed portion 112T of top pole 112, extends out on to the plane of a x b surface 111.

In the case in which head 100 is a pico-sized thin-film head, the respective dimensions of a, b and c of block 102 have the very small values, typically 0.049×0.039×0.012 inches (i.e, 1.24×0.99×0.305 mm). The dimensions of the thin-film elements included in region 110 that are shown in FIG. 1a are orders of magnitude smaller than these. By way of illustrative examples shown in FIG. 1a, the width and height dimensions of top pole tip 112 are typically 5 and 2 micrometers ($\mu$m), respectively; the width and height dimensions of bottom pole tip 114 are typically 15 and 2 $\mu$m, respectively; the narrow gap of $Al_2O_3$ 118 material separating the top and bottom poles is typically 0.2 $\mu$m; each of the width and height depth dimensions of each of cavities 117-1 and 117-2 is typically 6 $\mu$m, the depth dimension of each of cavities 117-1 and 117-2 is about 2 $\mu$m and the spacing between cavities 117-1 and 117-2 is typically 1.5 $\mu$m. Generalizing, the range of variable values for the widths of top and bottom pole tips 112 and 114 is typically 3–5 $\mu$m and 10–20 $\mu$m, respectively; for the height of each of top and bottom poles 112 and 114 is typically 2–4 $\mu$m; for the narrow gap 118 is typically 0.2–0.4 $\mu$m; for the width and height dimensions of each of cavities 117-1 and 117-2 is typically 6–8 $\mu$m, with the depth of each of cavities 117-1 and 117-2 remaining about 2 $\mu$m and the spacing between cavities 117-1 and 117-2 is typically 1.0–1.5 $\mu$m.

Figure 1:
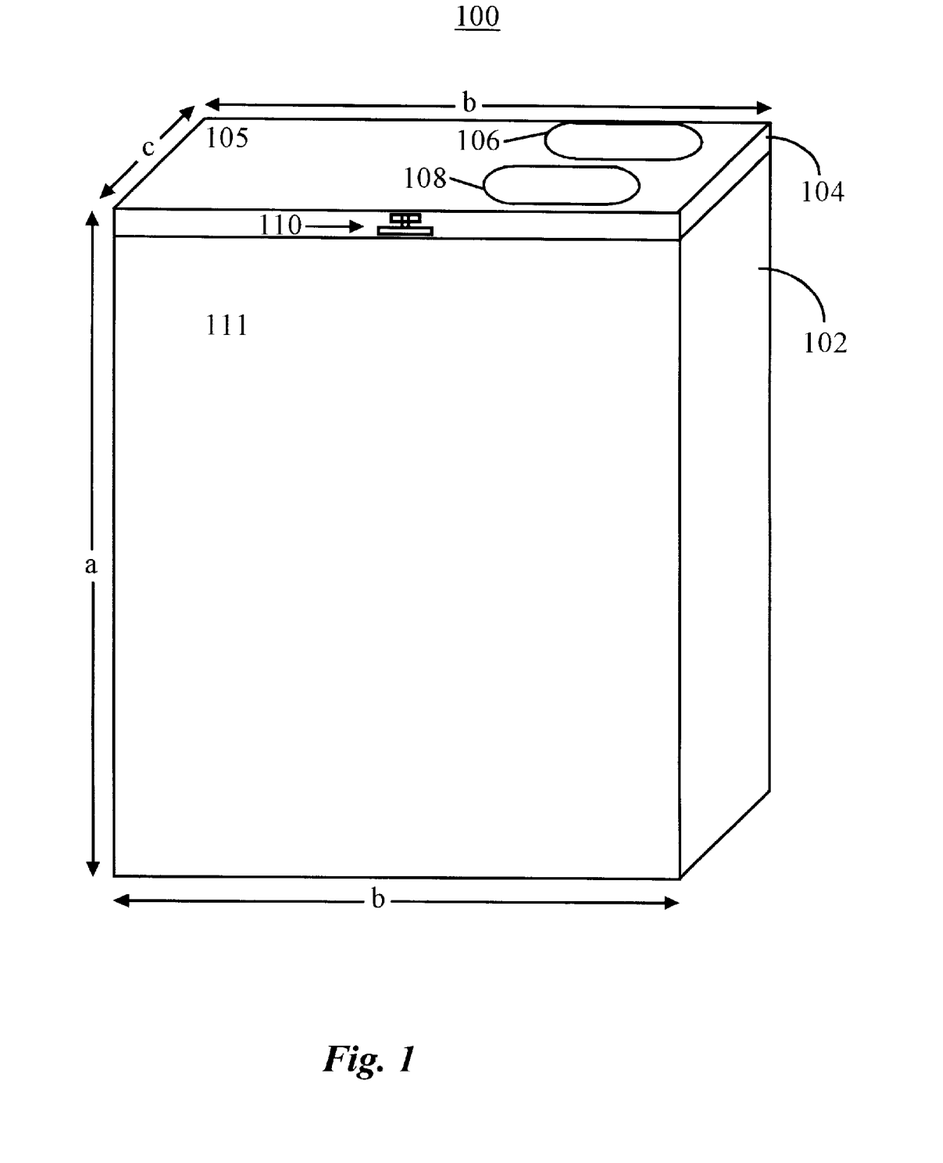
FIG. 1 diagrammatically illustrates a completely fabricated thin-film head.
Figure 1A:
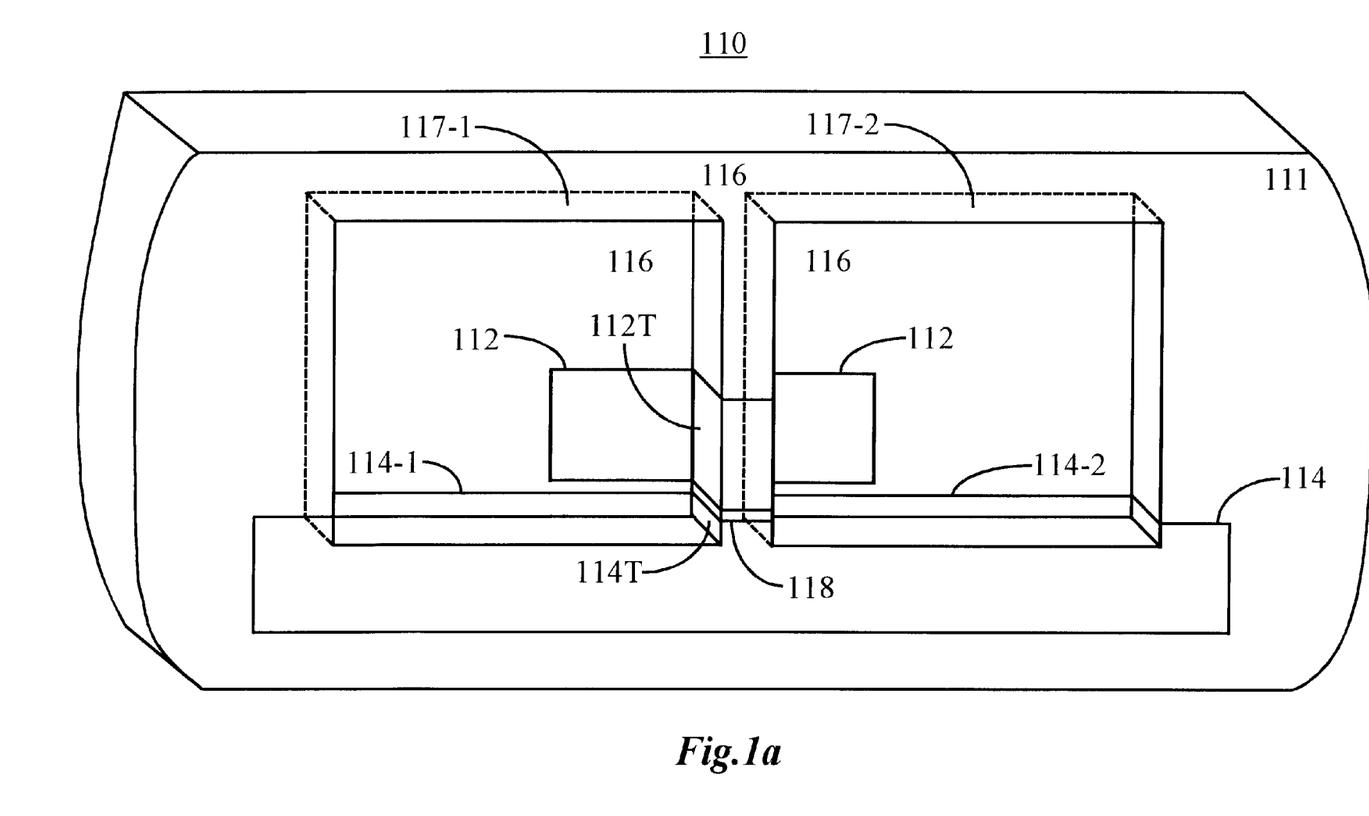
FIG. 1a is a detail drawing that diagrammatically illustrates the trimmed pole tips of the fabricated thin-film head shown in FIG. 1.

FIGS. 2a–2d are directed to an efficient process, employing optical microlithographic techniques, for fabricating miniaturized components, such as thin-film read/write heads of the pico-sized variety shown in FIGS. 1 and 1a. The first step of such fabrication process employs conventional optical microlithographic and step and repeat techniques to successively lay down each of a stack of thin-films, that together define a large plurality of spaced identical thin-film heads arranged in rows and columns, on the top surface of a ceramic substrate wafer that is preferably composed of $Al_2O_3$/TiC. As diagrammatically shown in FIG. 2a, at the completion of this first step, each of the large plurality of spaced thin-film heads 200-11 to 200-mn (represented in FIGS. 2a and 2b by white circles) is totally embedded in thin-film stack 202 situated on the top surface of wafer 204. In practice, wafer 204 may have either a circular or rectangular shape and cross-sectional dimensions typically between 2 and 8 inches. However, the value a of thin-film covered wafer 204's thickness is substantially the same as the value of the dimension a of the single completed thin-film head shown in FIG. 1. Thus, in practice, a thin-film covered wafer may comprise thousands of individual pico-sized thin-film heads.

Figure 2A:
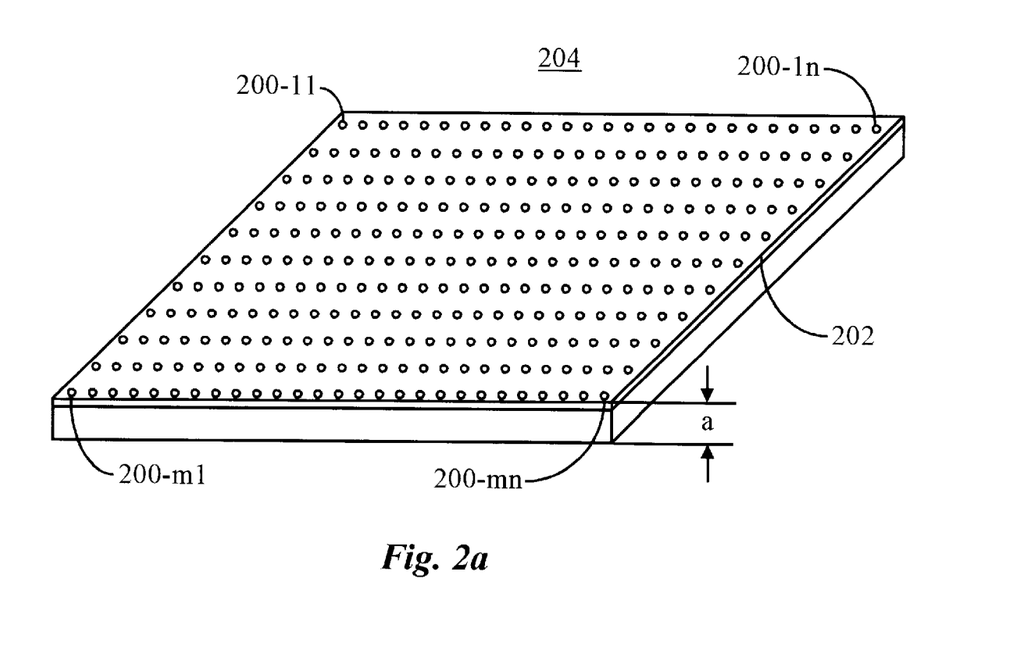
FIGS. 2a–2d, respectively, illustrate successive steps of a process utilizing optical microlithography for fabricating thin-film heads of the type shown in FIG. 1.
Figure 2B:
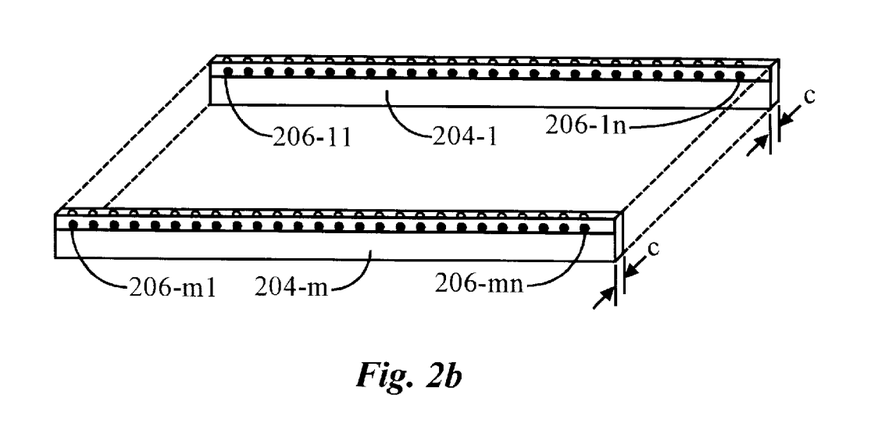

The second step of the fabrication process involves sawing thin-film covered wafer 204 into individual rowbars 204-1 to 204-m shown in FIG. 2b, with each rowbar (1) comprising n spaced identical thin-film heads and (2) having a depth dimension value c substantially the same as the value of the dimension c of the single completed thin-film head shown in FIG. 1. Sawing thin-film covered wafer 204 into individual rowbars 204-1 to 204-m results in the exposure of the untrimmed pole tips 206-11 to 206-mn (represented in FIGS. 2b and 2c by black circles) of each individual thin-film head 200-11 to 200-mn associated with the corresponding one of the respective rowbars 204-1 to 204-m.

Figure 2C:
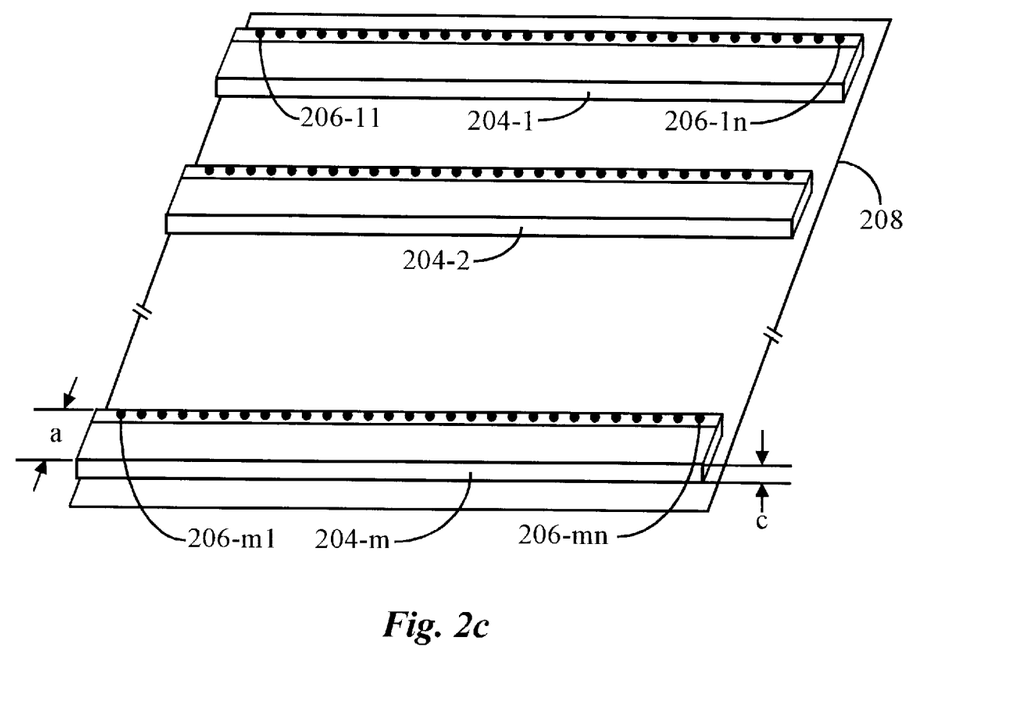

The third step of the fabricating process involves (1) turning each rowbar on its side so that the exposed untrimmed pole tips thereof now face upward, (2) polishing this now upper surface of each of the rowbars until it is optically flat to a tolerance of about 1 μm, (3) then gluing the respective row bars 204-1 to 204-m, in spaced relationship with one another, to carrier 208, with the exposed untrimmed pole tips thereof 206-11 to 206-mn still facing upward, as shown in FIG. 2c, and (4) coating this optically-flat, upper surface of the respective row bars 204-1 to 204-m with a photoresist (which, in practice, may be either a positive or a negative resist, but, for illustrative purposes, is assumed herein to be a positive resist). As indicated in FIG. 2c, each of the respective row bars 204-1 to 204-m glued to carrier 208 now has an upper surface width equal to a and a height above carrier 208 equal to c.

Figure 2D:
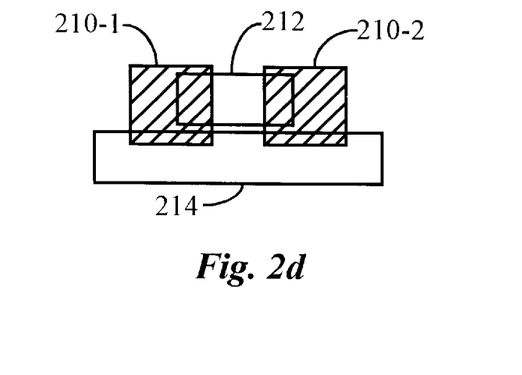

The fourth step of the fabricating process involve (1) first supporting carrier 208 on a servo-controlled stepper table having 6 degrees of freedom and (2) then employing optical microlithography to trim the pole tips of each thin-film head of each of the respective rowbars 204-1 to 204-m. The fourth step makes use of a lithography tool to align a projected trim-pattern image on the untrimmed pole tips of at least one of the thin-film heads on the optically-flat upper surface of one respective rowbars 204-1 to 204-m at a time and then expose the resist coating of these untrimmed pole tips with the aligned trim patterns. In this regard, the upper surface of the respective row bars shown in FIG. 2c includes a plurality of reference markers (not shown), having known spatial positions with respect to one another and with respect to the position of each of the untrimmed poles, which the lithography tool can use in aligning the trim patterns. Typically, the lithography tool is capable of aligning and exposing the untrimmed pole tips of 8 to 12 thin-film heads of an individual rowbar on each exposure of the resist with the aligned projected trim pattern. However, FIG. 2d shows the relative positions of the resist covering regions 210-1 and 210-2 exposed to a focused image of ultra-violet radiation defining a trim pattern that is aligned with respect to untrimmed top pole tip 212 (corresponds to top pole tip 112 in FIG. 1a) and untrimmed bottom pole tip 214 (corresponds to bottom pole tip 114 in FIG. 1a) of only a single thin-film head of any selected individual one of rowbars 204-1 to 204-m.

After the regions corresponding to regions 210-1 and 210-2 of all the thin-film heads incorporated in all the respective rowbars 204-1 to 204-m shown in FIG. 2c have been exposed, there takes place additional successive steps of the fabricating process (not shown in the drawing) that include (1) developing the resist; (2) ion milling only all those regions defined by the developed exposed resist to create two excavated cavities for each of the thin-film heads in the upper surface of the respective row bars shown in FIG. 2c; (3) stripping the remaining resist, and (4) sawing all the respective row bars on the carrier shown in FIG. 2c in a direction orthogonal to the length of a rowbar to produce thereby a large plurality of individual completed thin-film heads, each of which is substantially identical to the completed single thin-film head shown in FIG. 1.

It is essential that means, such as an air gauge, be employed to properly position a servo-controlled stepper table so that those untrimmed poles on the optically-flat upper surface of a rowbar that are to be exposed at a certain time to a focused trim-pattern image are both aligned with the focused image and situated within the very small depth of focus of the focused image. However, the width a dimension, in the case of a pico-sized rowbar, is only 1.24 mm. This makes a conventional scaled-down, circular-configured air-probe structure of an air-gauge nozzle unsuitable for achieving the aforesaid proper positioning in the case of a pico-sized rowbar, due to the above-discussed problems of air-probe back pressure, low flow rate, slow response time and proneness to mechanical damage caused by inadvertent contact with the workpiece surface.

Figure 3:
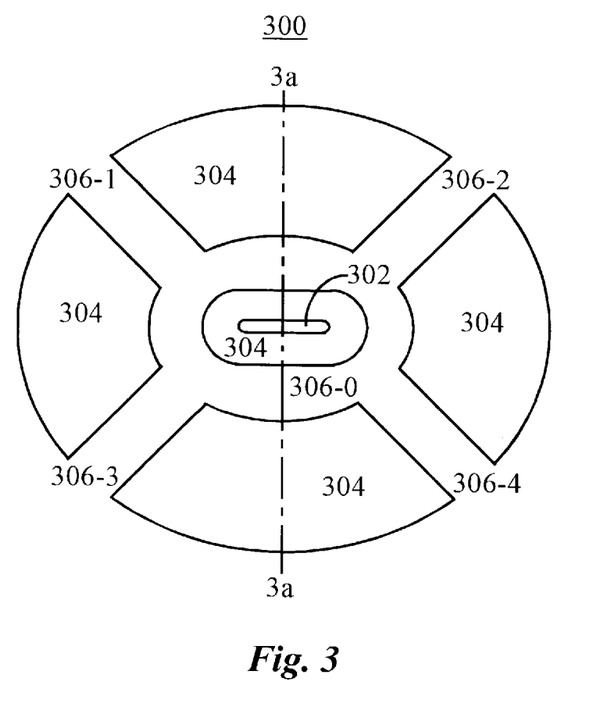
FIG. 3 diagrammatically illustrates a first embodiment of the configuration of the "footprint" of the output end of an air-probe nozzle of an air gauge in accordance with the present invention.
Figure 3A:
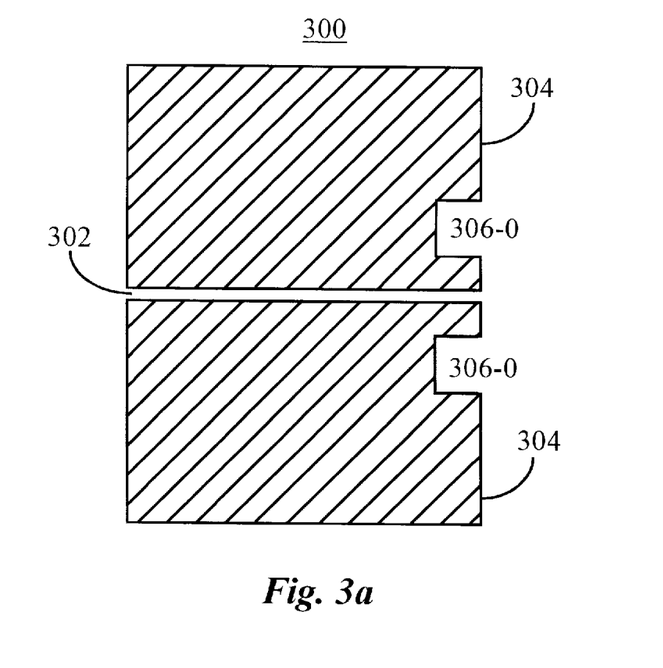
FIG. 3a is a cross sectional view through the vertical axis of the configuration shown in FIG. 3 that diagrammatically illustrates the depth of the protective manifold channels included in the configuration of the nozzle's output end shown in FIG. 3.

The configuration of the air-probe structure 300 of the present invention, illustrated in FIGS. 3 and 3a, of an air gauge nozzle provides a solution to all these problems of a scaled-down, circular-configured air-probe structure of the prior art. More particularly, FIG. 3 shows the "footprint" configuration of the output end of air-probe structure 300 and FIG. 3a shows a cross-sectional view of air-probe structure 300 through the vertical axis of the "footprint" configuration shown in FIG. 3. As depicted, air-probe structure 300 comprises a centrally-located, elongated air probe bore 302 surrounded by protective manifold 304. As indicated in the "footprint" configuration shown in FIG. 3, protective manifold 304 incorporates therein interconnected channels 306-0, 306-1, 306-2, 306-3 and 306-4. The cross-sectional view shown in FIG. 3a indicates the depth of channel 306-0. Each of channels 306-1, 306-2, 306-3 and 306-4 has substantially the same depth as channel 306-0.

In the case of an air-probe structure 300 of an air-gauge nozzle designed for use in achieving a proper focusing position for a pico-sized rowbar, the resolution along one axis is more critical than along the other axis (e.g., y axis versus x axis) which the present invention achieves. The size of elongated air probe bore 302 dimensions of air-probe structure 300 are very small. An illustrative example of the dimensions of the "footprint" of elongated air probe bore 302 comprise respective semi-circles each having a diameter of substantially 0.3 mm at the left and right ends of air probe bore 302 and a rectangle of substantially 0.3 mm width and substantially 1.0 mm length between the respective semi-circles. Thus, elongated air probe bore 302 has a width dimension of substantially 0.3 mm and an overall length dimension of substantially 1.3 mm.

This width dimension of substantially 0.3 mm for elongated air probe bore 302 satisfies the constraint that the width dimension of air probe bore 302 be significantly smaller than the 1.24 mm width of the upper surface of a pico-sized rowbar (as seen in FIG. 2c and equivalent to surface 111 in FIG. 1a), which is required in order to provide accurate air-gauge measurements of the distance between the output tip of air probe bore 302 and the upper surface of the pico-sized rowbar. Although a conventional circular cross-section air probe bore having a diameter of substantially 0.3 mm would meet this constraint, the very small area of its circular air probe tip results in causing back pressure that would prevent accurate air-gauge measurements of the distance between the output tip of such an air probe bore and the upper surface of the pico-sized rowbar from being achieved. However, because the rowbar's length causes no constraint on the length dimension of air probe bore 302, the size of the length of air probe bore 302 may be sufficiently larger than the size of the width thereof so that the area of its elongated air probe tip is big enough to avoid the production of a back pressure that would prevent accurate air-gauge measurements of the distance between the output tip of such an air probe bore and the upper surface of the pico-sized rowbar from being achieved.

As shown in FIG. 3, the overall size of the "footprint" of protective manifold 304 of air-probe structure 300 of an air-gauge nozzle is much larger than the size of the "footprint" of the tip of elongated air probe bore 302. An illustrative example of the overall dimensions of the "footprint" of protective manifold 304 comprise a horizontal dimension of substantially 7 mm and a vertical dimension of substantially 6 mm. The relatively large overall area of the "footprint" of manifold 304 protects the output end of air-probe structure 300 from mechanical damage caused by inadvertent contact with a workpiece surface (such as a rowbar surface). However, were it not for the presence of interconnected channels 306-0, 306-1, 306-2, 306-3 and 306-4 in of protective manifold 304, air trapped between the workpiece surface and the surface of protective manifold 304 would result in undesired back pressure being produced whenever the surface of protective manifold 304 comes into close proximity with the workpiece surface. This undesired back pressure is prevented by interconnected channels 306-0, 306-1, 306-2, 306-3 and 306-4 providing an escape route for such trapped air. An illustrative example of the cross-sectional dimensions of each of interconnected channels 306-0, 306-1, 306-2, 306-3 and 306-4 comprise a width of substantially 0.6 mm and a depth of substantially 0.5 mm.

Figure 3B:
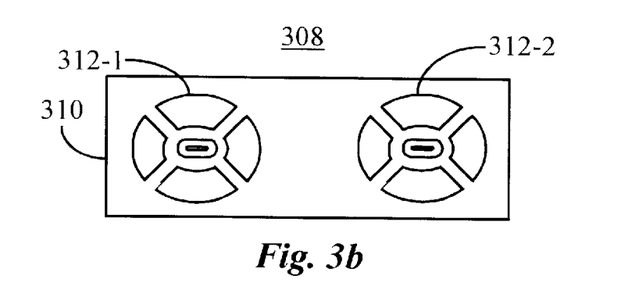
FIG. 3b diagrammatically illustrates the output end of an air-probe nozzle comprising two spaced air probes each having the "footprint" configuration shown in FIG. 3.

Although an air-gauge nozzle comprising only a single elongated air-probe structure 300, such as shown in FIGS. 3 and 3a, may be used to insure that a servo-controlled stepper table with 6 degrees of freedom positions the upper surface of a rowbar within the small depth of focus of an imaged pattern (such as a trim pattern), an air-gauge nozzle comprising a spaced pair of such elongated air-probe structures, such as shown in FIG. 3b, is more suitable because it enables tilt of the length of the rowbar surface with respect to the focused image plane to be avoided.

Specifically, FIG. 3b shows an air-gauge nozzle 308 comprising a single block 310 having its front end configured into two spaced, functionally-independent, elongated air-probe structures 312-1 and 312-2, each of which is similar in structure to elongated air-probe structure 300 shown in FIGS. 3 and 3a. The respective measured air pressures within each of air-probe structures 312-1 and 312-2 are used as inputs to the servo-controlled stepper table to achieve the desired one-dimensional tilt-free positioning of the rowbar surface.

Figure 3C:
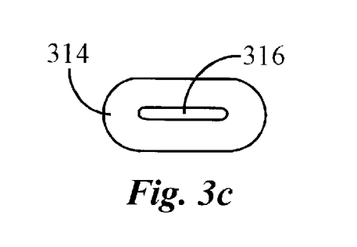
FIG. 3c diagrammatically illustrates a modification in accordance with the present invention of the configuration of the "footprint" of FIG. 3 in which the protective manifold channels included in the configuration of FIG. 3 are omitted.
Figure 4:
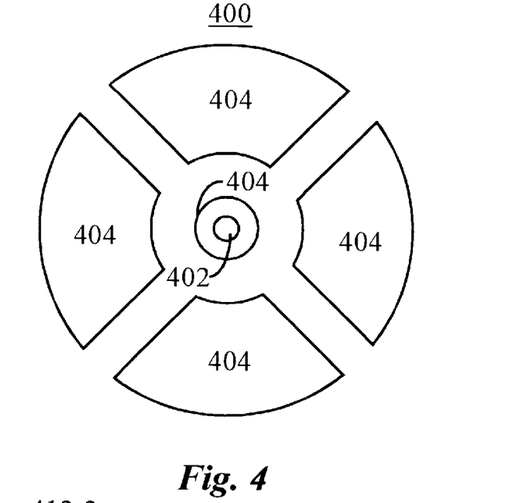
FIG. 4 diagrammatically illustrates a second embodiment of the configuration of the "footprint" of the output end of an air-probe nozzle of an air gauge in accordance with the present invention.

It is apparent that the elongated air-probe feature and the protective-manifold feature of the air-probe structure 300 shown in FIGS. 3 and 3a are severable features of the present invention. Thus, the present invention encompasses an air-probe structure 314, shown in FIG. 3c, which has an elongated air probe 316, but which dispenses with the protective manifold. The present invention further encompasses an air-probe structure 400, shown in FIG. 4, having a scaled-down circular (rather than elongated) air probe bore 402, but which includes a protective-manifold 404 which is similar to protective-manifold 304 of the air-probe structure 300 shown in FIGS. 3 and 3a. However, in order to avoid the problem of undesired back pressure in scaled-down circular air probe bore 402, the diameter of the scaled-down circular air probe bore 402 is sufficiently enlarged so that the "footprint" area thereof is at least equal to the "footprint" area of elongated air probe bore 302.

Figure 4A:
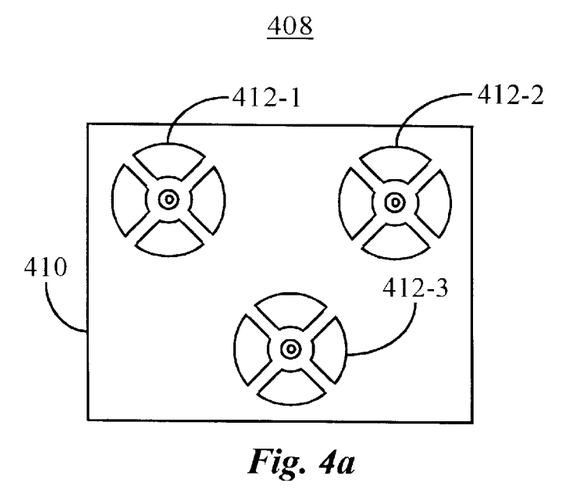
FIG. 4a diagrammatically illustrates the output end of an air-probe nozzle comprising three spaced air probes each having the "footprint" configuration shown in FIG. 4.

FIG. 4a shows an air-gauge nozzle 408 which would be suitable for positioning a workpiece surface having relatively small, but similar, length and width surface dimensions within the very small depth of focus of an imaged pattern. Specifically, air-gauge nozzle 408 comprises a single block 410 having its front end configured into three spaced, functionally-independent, circular air-probe structures 412-1, 412-2 and 412-3, each of which is similar in structure to circular air-probe structure 400 shown in FIG. 4. The respective measured air pressures within each of air-probe structures 412-1, 412-2 and 412-3 are used as inputs to the servo-controlled stepper table to achieve desired two-dimensional tilt-free positioning of the workpiece surface.

While the manifold of the air-probe structure of the present invention has been shown as elliptical and circular, the manifold need not be limited to either of those shapes. Any shape, regular or irregular, may be employed while achieving the same improved function of the specific shapes discussed above when combined with interconnecting air flow channels.

What is claimed is:

1. In a nozzle of an air gauge comprising an air-probe structure having an output end, wherein (1) said air-probe structure defines an air-probe bore having an output tip situated at said air-probe structure's output end, (2) the distance between said output tip and a workpiece can be controlled in accordance with the air pressure measured by said air gauge, and (3) said output tip of said air-probe bore has a given cross-sectional area that is sufficiently large to prevent inherent back pressure from being produced within said air-probe bore, but is sufficiently small to cause inadvertent contact between said workpiece and said bore's output tip to result in damage to said output tip; the improvement wherein:

said air-probe structure's output end further includes a protective manifold that surrounds said given cross-sectional area of said bore's output tip, the area of said protective manifold being sufficiently larger than said given cross-sectional area of said bore's output tip to prevent damage to said output tip by inadvertent contact between said workpiece and said bore's output tip.

2. The air-gauge nozzle defined in claim 1, wherein said protective manifold comprises:

a set of interconnected channels comprising a first channel which surrounds said output tip and is located in proximity to said output tip, and at least one other channel radiating from said first channel to the periphery of said output end of said air-probe structure;

whereby said interconnected channels provide an escape route for air emerging from said bore's output tip and thereby prevent back pressure from being produced in said air-probe bore in response to said output end of said air-probe structure being situated in close proximity to said workpiece.

3. The air-gauge nozzle defined in claim 2, wherein:

said set of interconnected channels comprises four other channels that are symmetrically spaced about said first channel, each of said four other channels radiating from said first channel to a different point on the periphery of said output end of said air-probe structure.

4. The air-gauge nozzle defined in claim 1 wherein:

said given cross-sectional are a of said output tip of said air-probe bore is defined by a length dimension which is significantly larger than a width dimension thereof; whereby said output tip is an elongated output tip.

5. The air-gauge nozzle defined in claim 4, wherein:

said width dimension has a first given value, said first given value being so small that a circular air-probe bore output tip having a diameter equal in value to said first given value would have a circular cross-sectional area that is insufficient in size to prevent inherent back pressure from being produced within said circular air-probe bore; and said length dimension has a second given value, said second given value being sufficiently larger than said first given value to provide said elongated air-probe bore output tip with said given cross-sectional area.

6. The air-gauge nozzle defined in claim 5, wherein said workpiece is a rowbar having a relatively narrow width dimension with respect to a length dimension thereof:

said narrow width dimension of said workpiece being larger than said first given value and smaller than said second given value of said elongated output tip; and said length dimension of said workpiece being larger than said second given value of said elongated output tip.

7. The air-gauge nozzle defined in claim 5, wherein:

said first given value of the width of said elongated output tip is substantially 0.3 millimeter; and said second given value of the length of said elongated output tip is substantially 1.3 millimeters.

8. The air-gauge nozzle defined in claim 7, wherein:

said protective manifold has a length dimension of substantially 7 millimeters and a width dimension of substantially 6 millimeters.

9. The air-gauge nozzle defined in claim 8, wherein said protective manifold comprises:

a set of interconnected channels comprising a first channel which surrounds said output tip and is located in proximity to said elongated output tip, and four other channels that are symmetrically spaced about said first channel, each of said four other channels radiating from said first channel to a different point on the periphery of said output end of said air-probe structure; and each of said interconnected channels of said set has a width dimension of substantially 0.6 millimeter.

10. The air-gauge nozzle defined in claim 1, wherein:

said output tip of said air-probe bore has a substantially circular cross-section; and the size of the area of said substantially circular cross-section of said output tip is sufficiently large to prevent inherent back pressure from being produced within said air-probe bore.

11. The air-gauge nozzle defined in claim 10, wherein said protective manifold comprises:

a set of interconnected channels comprising a first substantially circular channel which is substantially concentric with and surrounds said substantially circular cross-section output tip and is located in proximity to said substantially circular cross-section output tip, and at least one other channel radiating from said first channel to the periphery of said output end of said air-probe structure, and said output end of said air-probe structure has a substantially circular periphery which is substantially concentric with said substantially circular cross-section output tip.

12. The air-gauge nozzle defined in claim 11, wherein:

said set of interconnected channels comprises four other channels that are symmetrically spaced about said first circular channel, each of said four other channels radiating from said first circular channel to a different point on the periphery of said output end of said air-probe structure.

13. The air-gauge nozzle defined in claim 1, wherein:

said air-gauge nozzle comprises a single block having at least two of said air-probe structures extending from the output end of said block;

said respective air-probe structures are spaced apart a given distance from one another; and said respective air-probe structures are functionally independent of one another.

14. The air-gauge nozzle defined in claim 13, wherein:

said single block has three of said air-probe structures extending from the output end of said block; and said three of said air-probe structures are positioned with respect to one another in a triangular configuration.

15. In a nozzle of an air gauge comprising an air-probe structure having an output end, wherein (1) said air-probe structure defines an air-probe bore having an output tip situated at said air-probe structure's output end, (2) the distance between said output tip and a workpiece can be controlled in accordance with the air pressure measured by said air gauge, and (3) said output tip of said air-probe bore has a given cross-sectional area that is sufficiently large to prevent inherent back pressure from being produced within said air-probe bore, but is sufficiently small to cause inadvertent contact between said workpiece and said bore's output tip to result in damage to said output tip; the improvement wherein:

said given cross-sectional area of said output tip of said air-probe bore is defined by a length dimension which is significantly larger than a width dimension thereof; whereby said output tip is an elongated output tip.

16. The air-gauge nozzle defined in claim 15, wherein:

said width dimension has a first given value, said first given value being so small that a circular air-probe bore output tip having a diameter equal in value to said first given value would have a circular cross-sectional area that is insufficient in size to prevent inherent back pressure from being produced within said circular air-probe bore; and said length dimension has a second given value, said second given value being sufficiently larger than said first given value to provide said elongated air-probe bore output tip with said given cross-sectional area.

17. The air-gauge nozzle defined in claim 16, wherein said workpiece is a rowbar having a relatively narrow width dimension with respect to a length dimension thereof:

said narrow width dimension of said workpiece being larger than said first given value and smaller than said second given value of said elongated output tip; and said length dimension of said workpiece being larger than said second given value of said elongated output tip.

18. The air-gauge nozzle defined in claim 16, wherein:

said first given value of the width of said elongated output tip is substantially 0.3 millimeter; and said second given value of the length of said elongated output tip is substantially 1.3 millimeters.

\* \* \* \* \*